US 7,852,268 B2

(12) United States Patent
Schillmeier et al.

(10) Patent No.: US 7,852,268 B2
(45) Date of Patent: *Dec. 14, 2010

(54) RFID ANTENNA SYSTEM

(75) Inventors: Gerald Schillmeier, München (DE); Frank Mierke, München (DE); Thomas Lankes, Rosenheim (DE)

(73) Assignee: Kathrein-Werke KG, Rosenheim (DE)

( * ) Notice: Subject to any disclaimer, the term of this patent is extended or adjusted under 35 U.S.C. 154(b) by 829 days.

This patent is subject to a terminal disclaimer.

(21) Appl. No.: 11/785,581

(22) Filed: Apr. 18, 2007

(65) Prior Publication Data

US 2008/0258994 A1    Oct. 23, 2008

(51) Int. Cl.
  *H01Q 1/38* (2006.01)
(52) U.S. Cl. .............................. 343/700 MS; 340/572.7
(58) Field of Classification Search .......... 343/700 MS; 340/572.1, 572.7, 572.8
See application file for complete search history.

(56) References Cited

U.S. PATENT DOCUMENTS

| | | | |
|---|---|---|---|
| 6,825,766 | B2 | 11/2004 | Hewitt et al. |
| 7,050,005 | B2 | 5/2006 | Gottl et al. |
| 7,460,073 | B2 * | 12/2008 | Schillmeier et al. ... 343/700 MS |
| 2006/0017634 | A1 | 1/2006 | Meissner |
| 2006/0132312 | A1 | 6/2006 | Tavormina |
| 2007/0052521 | A1 | 3/2007 | Beedles et al. |
| 2007/0200701 | A1 | 8/2007 | English et al. |

FOREIGN PATENT DOCUMENTS

| | | |
|---|---|---|
| DE | 10256960 B3 | 7/2004 |
| EP | 0598624 A1 | 5/1994 |
| EP | 0440370 B1 | 3/1995 |
| EP | 1357635 A1 | 10/2003 |
| EP | 0956613 B1 | 9/2004 |
| EP | 1708119 A1 | 10/2006 |
| EP | 1758204 A1 | 2/2007 |
| WO | 99/30384 | 6/1999 |

OTHER PUBLICATIONS

Klaus Finkenzeller, RFID Handbook: Fundamentals and Applications in Contactless Smart Cards and Identification, Second Edition, Chapters 1.2, 1.3, 2.3 to 2.5.4 and 3.1 to 3.1.2, Copyright 2003, John Wiley & Sons, Ltd.

* cited by examiner

*Primary Examiner*—Michael C Wimer
(74) *Attorney, Agent, or Firm*—Nixon & Vanderhye PC

(57) ABSTRACT

An RFID antenna system with the following features: the RFID antenna device, with respect to the goods identification system (GIS) or a side limit receiving this RFID antenna device, comprises at least two antenna, the at least two antennae for the goods identification system (GIS) consist of patch antennae, the at least two patch antennae are arranged mutually offset in the direction of the passageway or passage region, or at least with one component mutually offset in the passage direction, and the at least two patch antennae are arranged at an equal spacing from a floor area of the passageway and/or on the same horizontal plane or offset thereto, and, more precisely, in such a way that a straight line laid through the center points and/or centers of gravity of at least two adjacent patch antennae encloses an angle α with respect to a horizontal plane and/or a plane that is parallel to the floor space, which angle is $\leq 45°$.

25 Claims, 4 Drawing Sheets

RFID ANTENNA SYSTEM

Figure 1:
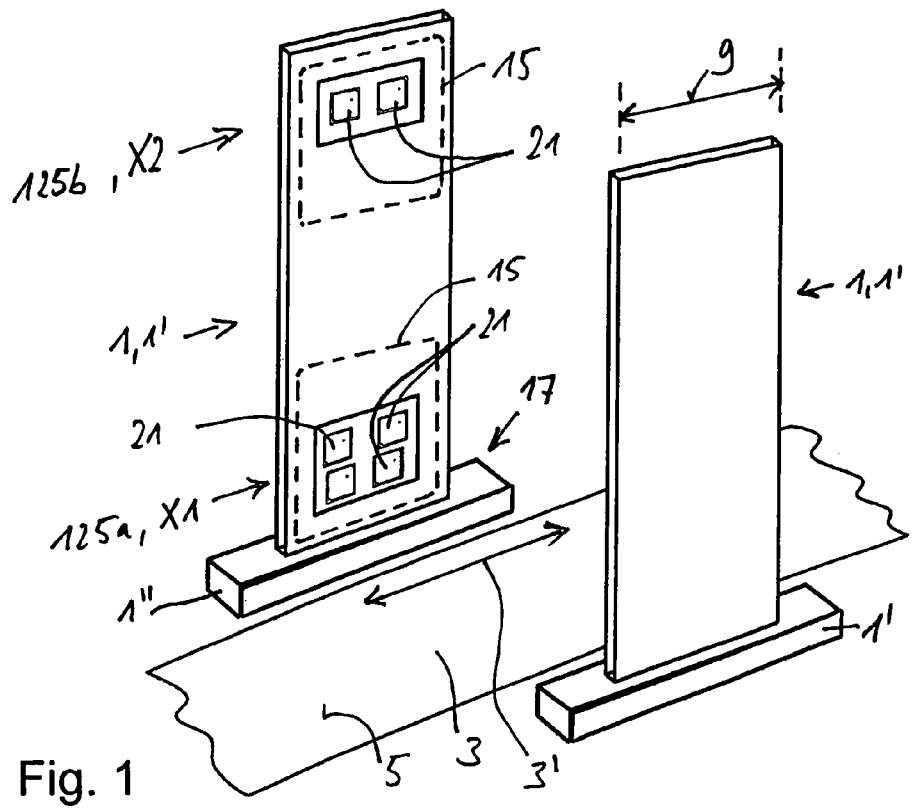

The invention relates to an RFID antenna system, comprising an RFID antenna device for an electronic article surveillance system (EAS) and comprising an RFID antenna device for a goods identification system (GIS).

What are known as electronic article surveillance systems are used in particular to secure goods, for example at the exit to department stores, shops, etc. These systems consist of RFID antenna systems which are arranged at a spacing from each other in the region of the exit or a passage and between which the passageway for monitoring is formed.

The corresponding products and goods obtainable in a shop are secured for example by means of an electronic retail security tag. If the goods are properly paid for the corresponding retail security tag is removed by the sales staff, so the customer can pass with the goods through the monitored exit passage without problems.

If the goods are taken through the monitored exit route while still in the secured state, an acoustic warning signal is usually emitted in the monitored region in order to signal for example that an attempt is being made to take goods that have not been paid for out of the shop.

Different electronic retail security systems have become known.

According to one known method what are known as radio frequency tags (RF tags) are used. A coil is provided on a radio frequency tag of this type, the connecting ends of which coil are capacitively connected to each other. Transmitting antennas are used as the monitoring antennas and emit electromagnetic rays for example in a range of 6 to 10 MHz. If a corresponding RF tag is passed through the monitored region it draws transmitting energy from the system, and this can be detected by means of a corresponding electronic evaluator.

An electromagnetic method has also become known in which long metal strips are provided on the goods to be secured. These metal strips consist of a magnetizable alloy. If goods secured in this way are led through the magnetic alternating field of the corresponding antennas used for monitoring, which, for example, radiate at a frequency of 10 Hz to 20 KHz, this leads to saturation magnetization, the steep sides of the magnetization generating harmonics in the alternating field which can be detected, as follows:

The above-mentioned EAS systems operate in the manner of a 1-bit transponder in which the existence or non-existence of a specific tag can be recognized in the monitored and reading region.

In addition to methods and systems used for monitoring, what are known as UHF-RFID methods are also already used for article detection and identification. In this case goods to be detected are provided with an RFID tag. With respect to the above-mentioned method this method first of all provides the fundamental advantage that it is not only possible to evaluate a single bit as information by means of an RFID tag, rather these UHF-RFID tags are provided with a microchip on which information with a word length of several places can be stored and read out therefrom. What are known as passive RFIDs are preferably used which for reading-out the tag content and sending back the corresponding information obtain their energy from the electromagnetic field of the antenna system. The RFID tag comprises an antenna structure with said microchip. As is known, what is referred to as a reader is used to read-out information, which reader, via an antenna system for example, supplies the tags with the energy necessary for operation by way of the electromagnetic field, the tags provided with the microchip then being able to emit an appropriate response to the stored information by using this energy, it being possible to read and evaluate the response via an antenna system and an RFID reader connected downstream.

With respect to the construction of an RFID antenna system for an electronic article surveillance system (EAS) reference is made by way of example to the anticipatory document WO99/30384 A1. Reference is also made to the anticipatory document "3 Fundamental Operating Principles" in RFID Handbook: Fundamentals and Applications in Contactless Smart Cards and Identification, Second Edition, Klaus Finkenzeller, Copyright© 2003, John Wiley & Sons, Ltd., ISBN: 0-470-84402-7, Chapters 1.2, 1.3, 2.3 to 2.5.4 and 3.1 to 3.1.2.

Basically it is desirable to use an antenna device, for example a UHF-RFID antenna device, in addition to an antenna system for an electronic article surveillance system (EAS) in order to hereby construct a goods identification system. Specific items of information about goods and products that are moved past in the monitored region could be read-out via such a system, the information being important for various processes.

The object of the present invention is therefore to create an improved RFID antenna system which, on the one hand, comprises an antenna device for an electronic article surveillance system and, on the other hand, an antenna device for a goods identification system (GIS) for reading-out tags provided with a microchip. This should involve a basically simply constructed system, wherein it should be ensured that the different antenna systems firstly shall not adversely affect the EAS system and secondly shall not adversely affect the GIS system. In other words optimum integration of both systems should be made possible.

An expanded RFID system for electronic article surveillance (EAS) on the one hand and for implementing a goods identification system (GIS) on the other hand is created by the present invention which is distinguished by its high integration capacity and by an optimum use. Said goods identification system and the associated antenna device may also be subsequently retrofitted in an existing RFID antenna system for an electronic article surveillance system (EAS) without the functionality and mode of operation of this EAS system or the goods identification system being adversely affected by retrofitting.

The improved system according to the invention operates on the basis of RFID technology.

To achieve a simply constructed system with a high "hit rate" and high functional efficiency it is provided according to the invention that the antenna system provided at the side of a transit region to be monitored comprises at least two antennas, these at least two antennas being arranged side by side in the passage direction, or at least with one component side by side in the passage direction. They do not have to be arranged at the same level (i.e. for example parallel to the level of the passageway), instead some may also be positioned at different levels. However, a straight line laid through the center points or centers of gravity of the two antenna systems arranged adjacent to each other should have an angular difference, with respect to a horizontal plane (or a plane running parallel to the passageway), which is preferably not greater than 45°.

According to the invention the UHF-RFID system comprises patch antennas or consists of patch antennas. These have a particularly low overall height and can therefore be retrofitted without problems into existing EAS antenna system devices, which frequently comprise frame-like antennas, for example within the frame-like antennas of the existing EAS surveillance system.

The arrangement of two patch antennas which are arranged laterally offset in the passage direction or are arranged with one component mutually offset in the passage direction, means that improved bundling of a monitored region may be achieved with simple means. This provides significant advantages in this respect since goods or products accordingly provided with tags are only detected and read-out if a person actually walks through the defined reading region (i.e. the monitored region) with a product equipped with an RFID tag comprising a microchip and not when they are merely passing in the vicinity of this reading region. This primarily ensures that no premature detection is triggered, for example, by a person merely walking past the immediate vicinity of the passage secured by two laterally erected antenna systems (for example while still in the shop), and in the process a product secured with a tag can arrive in the detection and/or reading region of the antenna system.

The patch antennas according to the invention can be constructed as individual patch antennas. They can however also be constructed as combined patch antennas which are constructed for example on a common ground plane, on a common substrate, etc., so only the patch planes on this substrate are arranged so as to be separate from each other. Any desired modifications are possible here.

In a particularly preferred embodiment of the invention at least two pairs of patch antennas are arranged one above the other, for example on each side antenna device, i.e. on two different levels or planes (it being possible, as mentioned above, for the patch antennas that cooperate in pairs respectively to not necessarily be arranged at the same level but to be mutually offset, at least to the given extent).

However it is just as possible for not just two but a plurality of antennas, for example three or more patch antennas, to be used in the passage direction in order to hereby reduce the bundling region and therewith the narrowing of the monitored region in the direction of the passageway to an optimally narrow passage zone.

In addition to the above-mentioned preferred variants it has also proven advantageous to use additional antennas devices, in particular patch antennas, used for detection, optionally in the lower transition region from the lateral limiting devices that receive the antenna systems to the floor space (and/or to the ceiling space), likewise again in a preferably paired arrangement, and, more precisely, so as to be located mutually offset in the passage direction. The patch antennas at the transition region to the floor and/or in the transition region to a ceiling can preferably be mechanically pre-adjusted such that their main direction of radiation is substantially not parallel to the plane of the passageway (the floor space) but in a deviation therefrom, are equipped with a component extending in the vertical direction. It is thereby possible therefore to slightly upwardly align for example the main direction of radiation of antenna systems that are arranged very low and to slightly downwardly align the direction of radiation of antenna systems that are arranged very high. The monitored region can thereby be optimized irrespective of the positioning of the antennas.

As an alternative or in addition it is also possible however to electronically align and/or adjust the antennas in order to, at least to a certain extent, differently pre-adjust the detection and/or reading region and thereby optimize it/them. This can be achieved for example by a predefined, or optionally also adjustable, phase offset between two patch antennas that are arranged one above the other.

According to the invention it is also possible by way of a mechanical pre-adjustment and/or storage of two patch antennas located adjacent to each other in the passage direction to carry out with a phase offset, whereby the region to be monitored can be adjusted from a plane of symmetry between the two patch antennas in one direction or the other direction of the passageway.

According to the invention the patch antennas can operate so as to be linearly or circularly polarized. In particular circularly polarized operation of the patch antennas has advantages insofar as it ensures that goods equipped with RFID tags are always reliably recognized and the information stored on the tags can be read-out completely and without problems irrespective of the orientation of the tag when the reading region is crossed.

This RFID system preferably operates in the UHF range, i.e. for example in the 800 MHz to 1,000 MHz range (in particular in the 800 MHz to 950 MHz range, for example 868 MHz range). The reading range of the patch antennas can be up to 1.5 m or more (i.e. for example up to 2 m, etc.).

Figure 2:
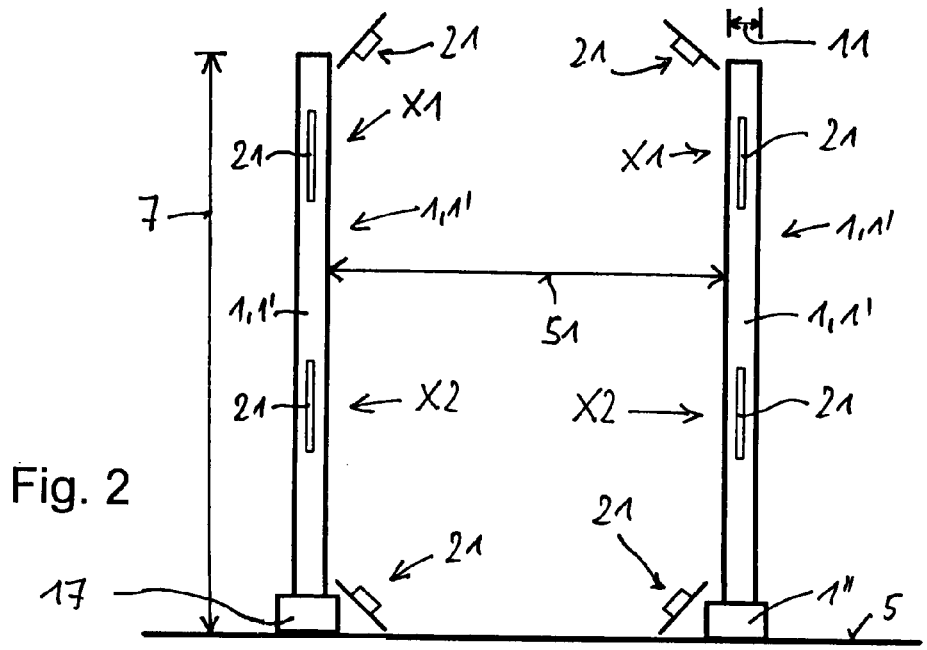
Figure 3:
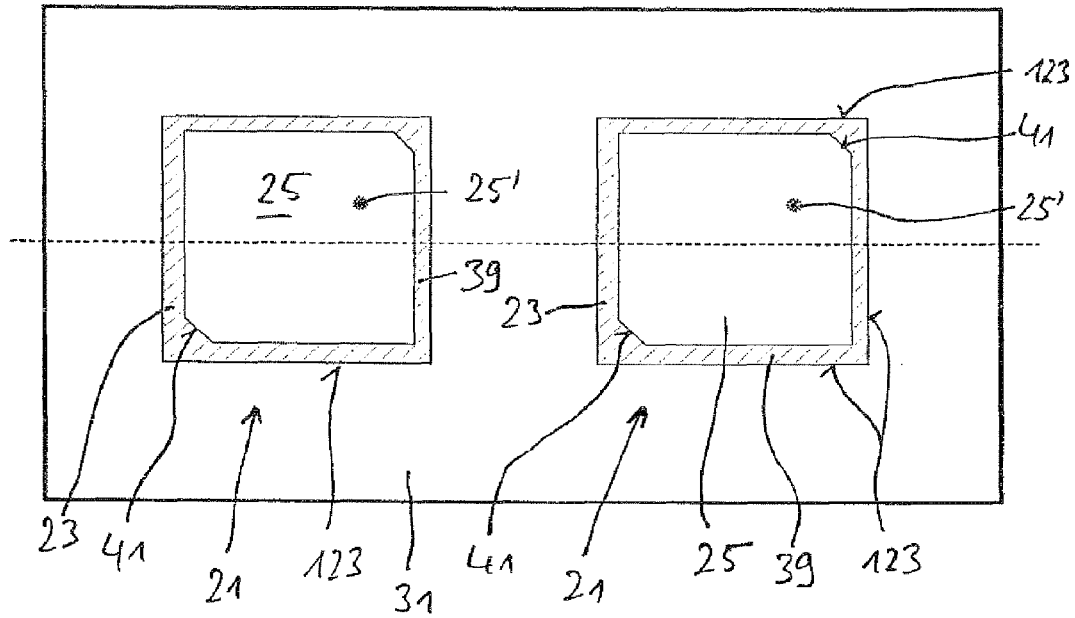
Figure 4:
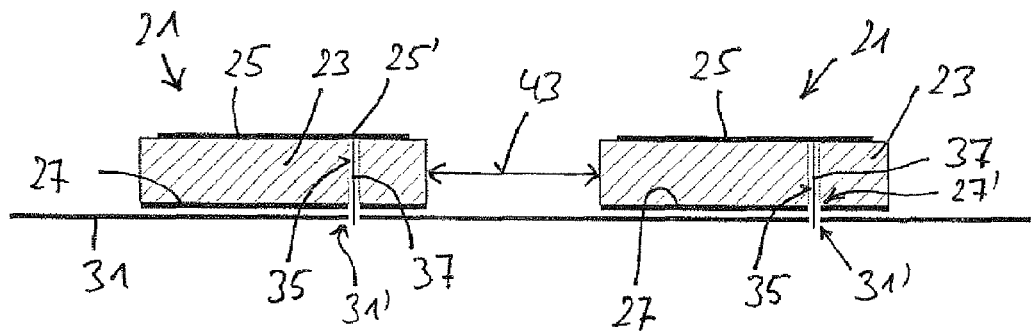
Figure 5:
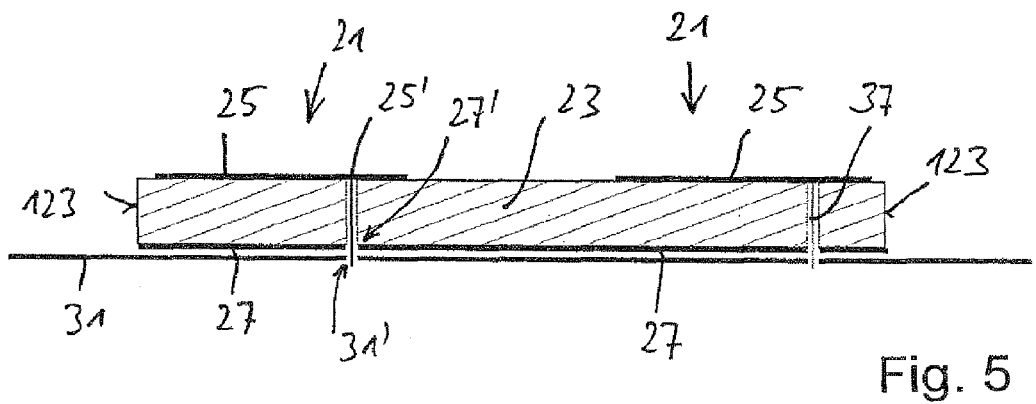
Figure 6:
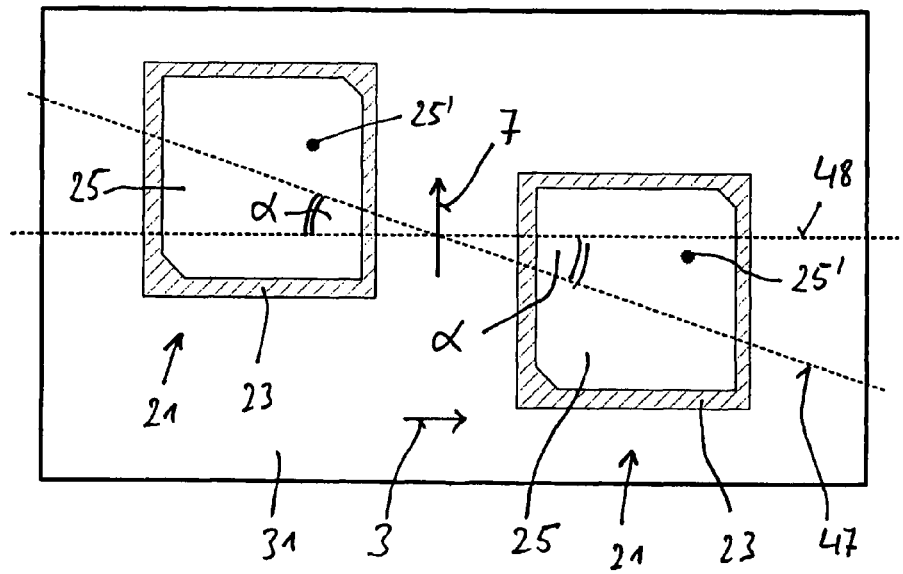

Further advantages, details and features of the invention emerge from the embodiments described with reference to various figures, in which in detail:

FIG. 1 shows a schematic diagram of a monitored region or passage, the antenna used for electronic article surveillance and the antennas provided for the goods identification system being indicated or shown by way of example in the left-hand antenna system, FIG. 2 shows a schematic elevation in the passage viewing direction of the UHF antenna arrangement according to the invention for an electronic article surveillance system (EAS), FIG. 3 shows a schematic plan view of a patch antenna pair used, FIG. 4 shows a corresponding cross-sectional view, parallel to the passage directions onto the patch antenna pair reproduced in FIG. 3, FIG. 5 shows an embodiment modified with respect to FIG. 3 and in a cross-sectional view, FIG. 6 shows an embodiment of a patch antenna pair that differs from FIGS. 3 and 4.

Figure 7:
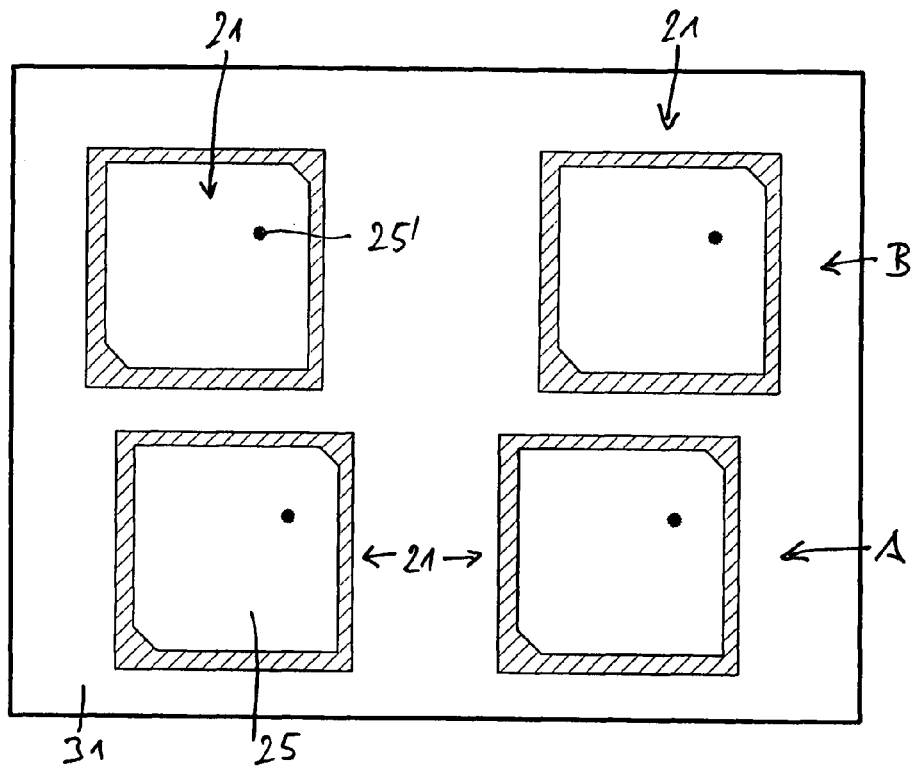
Figure 8:
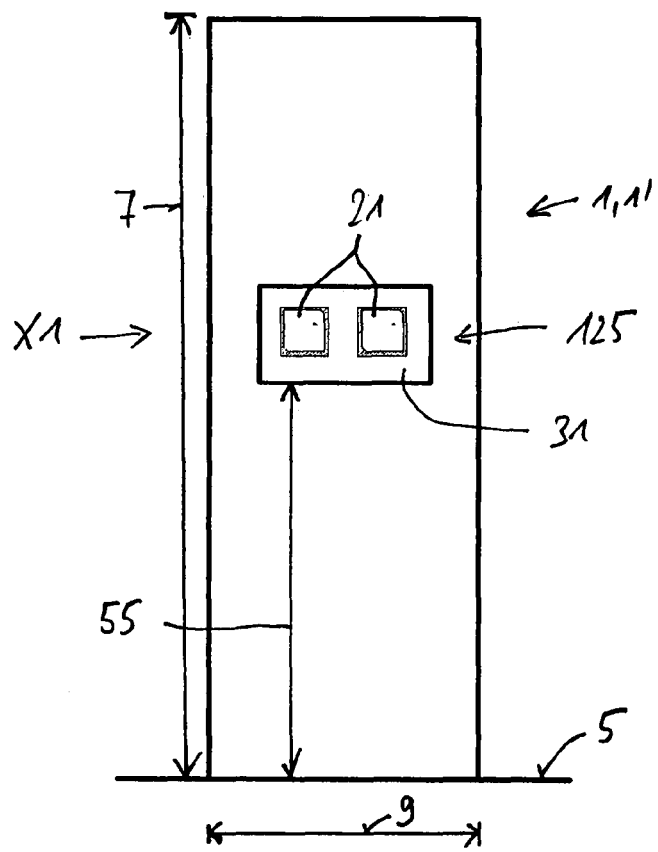
Figure 9:
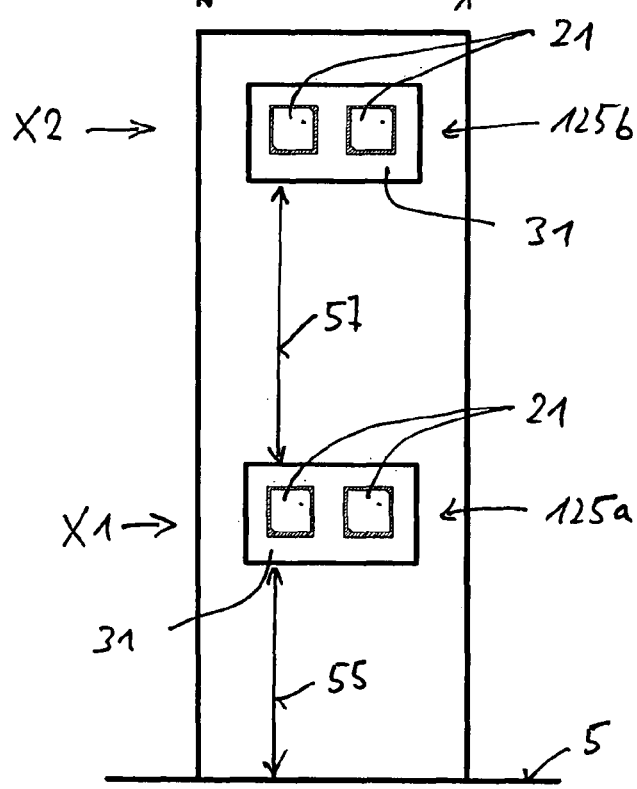

FIG. 7 shows a further modified embodiment in plan view of the patch antennas used, FIG. 8 shows a further detailed view of a possible variation, and FIG. 9 shows a simplified variant in a view corresponding to FIG. 8.

FIG. 1 reproduces the schematic basic construction of an electronic article surveillance system (EAS) and, more precisely, with two antenna devices 1 arranged so as to be mutually offset and between which a passageway 3 runs through and along the passage direction 3' on a floor space 5.

The antenna devices 1 are formed in the manner of side limits 1' which substantially comprise a height or vertical extension 7 running transversely, or in particular perpendicularly, to the floor space 5, a transverse or horizontal extension 9 running parallel, or substantially parallel, or with one component parallel, to the passageway 3 and a thickness extension 11, which is formed so as to be comparatively narrow by contrast, transverse or perpendicular to the passage direction 3 and therewith in particular parallel to the floor space 5.

A conventional EAS surveillance system is usually constructed in such a way that in a side limit 1' the antenna device comprises for example one, or preferably two, approximately rectangular frame antenna(s) 15 which are activated accordingly.

A transmission and/or evaluation unit 17 is preferably provided in the foot region 1" of this side limit 1.

Activation and evaluation of a thus formed electronic article surveillance system (EAS) based on what is known as RFID technology forms part of the prior art and in this respect is sufficiently known. Reference is made in this respect to known methods and devices. Systems of this type conventionally operate in a frequency range of for example 10 Hz to 20 kHz (if for example an electromagnetic method is used, or for example at 8 to 9 MHz (typically around 8.2 MHz), if for example a radio frequency method is used).

In addition to the above-described antenna systems for the electronic article surveillance system (EAS), a UHF-RFID system which is used for goods identification is provided in the present case. Additional antennas in the form of patch antennas are provided for this purpose.

As stated, by using tags with microchips this system (GIS) primarily serves to detect and read-out product-based information, i.e. information about goods on which the relevant tag is provided. Ultimately however this information can also be used in a further step to ultimately also construct an electronic article surveillance device hereby (if for example the product-based information stored on the tag is read-out and compared for example with information stored via a checkout system in order to query whether a product provided with the relevant tag has already been paid for or not).

A first variant of the UHF-RFID goods identification system has already been reproduced in FIG. 1 in a schematic view.

In FIG. 1 a respective pair of patch antennas 21 is arranged in an upper region and a further pair of patch antennas 21 in a lower region of the side limit 1' or the side antenna device 1 and, more precisely, within the frame-like frame antennas 15 in the illustrated embodiment, when viewed transversely to the side limits.

The patch antennas are antennas which, according to the illustration of FIG. 3 in a perpendicular plan view and in FIG. 4 in a transverse view, comprise a substrate 23 (made of dielectric material or for example air), an upper patch plane 25 and a lower patch plane 27 being provided between this substrate 23 so as to be spaced apart. The patch plane 25 and the ground plane 27 are arranged at a spacing 23' from each other that corresponds to the thickness of the substrate 23.

As may also be seen from the graphical illustration and in particular from FIG. 4, the two patch antennas 21 are arranged parallel and upstream of a ground plane 31 and, more precisely, in such a way that the lower ground plane 27 of the respective patch antenna 21 comes to rest so as to be electrically isolated from the ground plane 31 (i.e. in a capacitive arrangement thereto). In plan view the ground plane 31 projects beyond the patch antennas and protrudes laterally beyond the patch antennas in all directions. The ground plane 31 can be made for example from metal or a metal sheet or for example from a printed circuit board coated with copper.

The fact that the ground plane 27 of the patch antennas 21 is electrically isolated from the common ground plane 31 is taken into account in particular if conventional patch antennas are used which, for example, are glued to the ground plane 31 by using an adhesive (if this is not electrically conductive). Basically by producing a d.c. or conductive contact a said patch antenna could also be placed directly with its lower ground plane 27 on the ground plane 31. It is basically also possible for example to omit the ground plane 27 that is situated on the substrate, that is to say if the chip antenna is constructed directly with its substrate on the ground plane 31.

In the described embodiment a through-opening 31' is moreover formed in the lower common ground plane 31 and in the respective ground plane 27 that forms part of the patch antenna 21 a through-opening 27' that is congruent therewith and a through-channel 35 that runs through the substrate 23, so a feeder 37 which is electrically-conductively connected at a feeding point 25' to the patch plane 25 located thereabove runs through this entire arrangement.

As an alternative a capacitive coupling to the patch plane 25 in the region of the feeding point 25' is also possible however. Finally, feeding of the patch plane 25 is also possible such that for example the feeder 37 is connected to the patch plane, for example at the edge of the patch plane, so as to rest and/or run on the surface of the substrate 23 (i.e. plane parallel to the plane of the patch plane). The patch plane can however also comprise a U-shaped recess or the like for example, so the feeder running in the plane of the patch plane 25 is electrically connected, for example at the end of the U-shaped recess (i.e. so as to lie more inwardly offset than the peripheral edge of the patch plane), to the patch plane.

In the illustrated embodiment the bottom ground plane 27 extends up to the peripheral side face 123 of the substrate 23, whereas the patch plane 25 that can be seen in plan view according to FIG. 3 ends at a spacing 39 in front of the side limit or side plane 123 of the substrate 23, i.e. in plan view is constructed with smaller lengthwise and transverse extensions than the lower ground plane 27 of patch antenna 21.

In the illustrated example the at least approximately rectangular plane of the patch antenna 21 is provided at two diagonally opposing corners with a bevel 41 which is used to adjust the antenna.

If air is used as the substrate 23 corresponding dielectric spacers that serve merely to mechanically hold the patch plane 25 are used, whereby the patch plane 25 is held and fixed at a spacing from the ground plane 21.

Two patch antennas formed in this way according to the embodiment in FIGS. 3 and 4 are arranged at a lateral spacing 43 (i.e. in an interior lateral spacing 43 between two side limit faces 123, which point toward each other, of the two adjacent patch antenna) and, more precisely, on a common ground plane 31.

In the illustrated embodiment the spacing between the two center points of the patch antennas or the centers of gravity of the two patch antennas are designated 45.

This center spacing 45 should be greater than or equal to 0.2 times $\lambda$ (lambda), based on the operating frequency used of the patch antennas, preferably the middle wavelength of the frequency used, namely for example at 0.2×34 cm=5 cm.

An optimum spacing could lie at $$0.5\times\lambda(=0.5\times34\ cm=17\ cm)$$

in particular if for example the UHF-RFID antenna system operates at a frequency of 868 MHz.

The patch antennas do not necessarily have to be identically constructed or be the same size however. They do not necessarily have to be arranged side by side and exactly horizontally offset, i.e. in the direction parallel to the passage direction 3', either (wherein it has been assumed in the illustrated embodiment that the passage direction 3' running in the horizontal direction runs parallel to the floor space 5).

It is also indicated with reference to FIG. 5 that a cooperating patch antenna pair basically does not categorically have to be formed from two individual patch antennas 21 as a whole, but can have a common construction.

The patch antenna pair according to FIG. 5 has a common ground plane 27 on the lower side of a common substrate 23, the two patch planes 25 that are separated from each other then being formed on the upper side of the substrate 23 and being fed by a separate feeder 37 which ends at a feeding point 25' on the associated patch planes 25. The patch antenna pair thus formed is arranged at a slight spacing above the common ground plane 31, so the ground plane 27 runs on the lower side of the substrate at a slight spacing from the common ground plane 31.

The patch antenna pairs partially shown in the figures are arranged so as to be mutually offset in the passage direction 3'. They do not have to be arranged exactly parallel to the passage direction 3' in the process. In particular the side spacing from a vertical plane lying in the passage direction 3' to the relevant patch plane 25 of a patch antenna 21 could also be different if, for example, the passage dramatically widens or narrows. Said patch antenna pair constitutes a basic embodiment of the invention in which at least two patch antennas 21 form a first group A of cooperating patch antennas 21. Even more patch antennas, for example three patch antennas, etc., could be arranged so as to be mutually offset in the passage direction, or with one component mutually offset in the passage direction, however.

With the aid of FIG. 6 it is shown that a cooperating pair of patch antenna 21 of this type may also be arranged with a certain mutual offset in the height or vertical direction in addition to in the passage direction 3'. A maximum difference in the height and/or vertical direction is preferably undertaken in such a way however that a straight line 47 laid through the center points or centers of gravity of the associated patch antenna pair encloses an angle α, with respect to a horizontal plane or to a plane 48 running parallel to the passageway or the floor space 5, which is less than or equal to 45°.

In addition however the patch antennas shown in FIGS. 1 to 6 could also be arranged so as to be mutually rotated, so in the case of one patch antenna the feeding point 25' is located more at the top and in the case of the adjacent patch antenna more at the bottom and in the case of one antenna more on the right-hand side and in the case of the other patch antenna for example more on the left-hand side, etc. There are basically no restrictions here either.

With the aid of FIG. 7 it is shown that for example one group of four patch antennas 21 or a plurality of groups of two or four, etc. can be used in an antenna device 1.

In the embodiment according to FIG. 7 there is provided in addition to a bottom or lower group of patch antennas A (in the illustrated embodiment in the form of a patch antenna pair A) a second group of patch antennas B that is located higher in comparison (in the illustrated embodiment in the form of a higher patch antenna pair B), the higher patch antenna pair B being arranged at an equal height or vertical offset (although this does not have to be the case) but being differently positioned in the passage direction 3' with respect to the lower patch antenna pair A. This results in a greater lateral offset 43 to 45 between the two patch antennas 21 of the patch antenna pair located further up. Each of said groups A and B or each further patch antenna group can—as already mentioned—also comprise more than two patch antennas which are arranged so as to be mutually offset in the passage direction, or mutually offset at least in one component in the passage direction.

In contrast to the illustrated embodiment the feeding points 25' can however come to rest at different points, i.e. do not all have the corresponding same alignment, as is indicated in FIG. 7.

The internal spacings 43 in the horizontal or passage direction 3' or in the height or vertical direction 7 can be of the order of magnitude of a few mm to a few cm (without categorical restriction to this size range).

This embodiment accordingly produces the further advantage that for example the lower row A of patch antennas 21 can be fed with a mutual phase offset in relation to the upper row B of patch antennas 21, so an electrical up-tilt, or depending on the arrangement, if desired, what is known as an electrical down-tilt may be produced. In other words the main direction of radiation or main lobe is thereby electrically pre-adjusted more in the ascending vertical orientation or more in the downwardly lowered vertical orientation. A certain fine adjustment of the monitored region may therefore be carried out hereby.

If for example said four patch antennas according to FIG. 7 are used more in the lower monitored region X1 (FIG. 1) according to FIG. 1, the patch antennas may be activated in such a way that the monitored region is electrically pre-adjusted more from the bottom floor upwards.

If a group of patch antennas of this type, illustrated with reference to FIG. 7, is used for example in the bottom region of the antenna device 1 (as FIG. 1 shows), a different phase activation with respect to the patch antennas arranged one above the other in the different rows or planes can take place in such a way that, for example, the main lobe or the main monitored region does not extend perpendicular to the ground plane 31 of the patch antennas but is oriented so as to extend upwards in the vertical direction with one component.

If a corresponding patch antenna group according to FIG. 7 is inserted for example in the upper region X2 (FIG. 1) of the antenna device 1, a different phase feed can be undertaken here in such a way for example that the main direction of radiation of the patch antennas is oriented in a specific angular range more so as to extend downward into the monitored region.

However, the different phase activation between the two patch antennas 21 a group A and/or B arranged adjacent and side by side at approximately the same height can also take place in such a way that the orientation of the monitored region is deflected according to the main direction of radiation (direction of the main lobe) of the patch antennas in one direction or in an opposite direction, based on the passageway 3, out of a center plane of symmetry that extends transversely thereto.

With the aid of FIG. 2 it is shown only schematically that, also by way of addition, additional patch antennas 21 may be provided for example in the floor region or ceiling region or for example at the foot region 1" of the antenna device 1 (or also at the upper end region of the antenna device 1). Individual patch antenna may also be used here. Preferably however a plurality of patch antennas that are each mutually offset in the passage direction, or with one component mutually offset in the passage direction, are used here as well, at least one respective pair of patch antennas or for example three, four or more patch antennas. In particular the patch antennas provided at the lower foot region or at the upper end region may also be oriented so as to be mechanically upwardly or downwardly pre-adjusted, in particular if electronic radiation forming and orientation, as described above with reference to FIG. 7, is not undertaken. If the patch antennas described in the lower or upper region of the side parts 1' or in the floor region or above the passageway (for example in a ceiling or suspended therefrom) are used as additional patch antennas, individual patch antennas may also be used in this case. Preferably however two or more patch antennas that are located side by side and are offset in the passage direction, or at least with one component mutually offset in the passage direction, or at least with one component mutually offset in the passage direction, are also used here, the antennas thus forming groups of patch antennas which cooperate.

With the aid of FIGS. 1 and 2 and 8 it is also shown that for example the two side antenna devices 1, i.e. the two side limits 1', can be arranged at a side spacing 51 from each other, which for example can vary between 0.8 m and 2.5 m, in particular between 1.4 and 2.0 m (it also being possible to fall below or exceed these limits).

The lateral antenna device 1, i.e. the side limit 1', preferably has a height 7 which, for example, can be 1 m to 1.80 m or 2 m on average.

The height of a patch antenna or a patch antenna pair, i.e. in particular the associated ground plane 31, can for example preferably be between 5 cm to 40 cm.

If two patch antenna combinations 125a and 125b are used according to FIG. 1, 2 or 8 (i.e. for example a patch antenna combination A and a patch antenna combination which are provided in the lower region XI and in the upper region X2 according to FIG. 1, 2 or 8), the spacing 55 of the lower patch antenna combination B 125a from the floor space should be at least 0.5 to 1.0 m. The spacing 57 between the lower patch antenna combination 125a and the upper patch antenna combination 125b should preferably be between 0.1 m and 2 m, in particular around 0.2 m to 1.2 m. The spacing can also be greater as desired if particularly high side limits 1' are used and the upper antenna devices should be located in a particular way.

If only one patch antenna combination with associated ground plane 31 is used, as is shown by way of example with the aid of FIG. 9, the spacing of this patch antenna combination 125 from the floor 5 should have a size of at least 0.5 m or more, it being possible for the overall height of the arrangement to again be 1 to 2 m.

The patch antennas 21 used for making possible an electronic goods identification system (GIS) preferably operate in the UHF frequency range, i.e. for example in a 800 MHz to 950 MHz or 1,000 MHz range (in particular in the range of 868 MHz). If this GIS system is used in addition to a conventional EAS surveillance system, which operates without said patch antennas, a conventional surveillance system is preferably used which operates for example in the 10 Hz to 20 kHz range (in particular in the case of electromagnetic EAS methods) or for example in the 5 MHz to 10 MHz range (for example around 8.2 MHz) if in particular a radio frequency EAS method is involved.

The patch antenna used according to the invention are used for an RFID surveillance system, so products, goods and/or people, etc. to be monitored may be detected if they still carry an RFID tag which can be recognized when passing through and along the passageway and the corresponding information can be read-out and evaluated by means of a "reader" provided for this purpose.

The system according to the invention has been described in particular with reference to a passageway. The surveillance system with a door along a passageway described with reference to FIGS. 1 and 2 can however also be constructed in such a way that corresponding side limits are arranged repeatedly side by side with lateral spacing, for example five side limits 1', whereby four passageways 3 located parallel and side by side are defined. In the central antenna devices 1 (i.e. not in the outermost antenna devices 1) patch antennas are in each case installed such that some of them radiate in one direction and some in the opposite direction to detect the two passageways.

Basically said antenna devices 1 for monitoring a passageway are inserted are used in such a way that one pair respectively of antenna devices 1 of this type is provided, i.e. one corresponding antenna device 1 respectively or one side limit 1', which are arranged so as to oppose the passageway for monitoring.

The invention claimed is:

1. An RFID antenna system for a goods identification system (GIS) comprising:
   at least two RFID antenna devices to read out from RFID tags equipped with microchips,
   the at least two RFID antenna devices being arranged at least on one side of a passage region for monitoring, and on two opposing sides with respect to the passage region extending therebetween, laterally offset from each other and therefore transversely to a passage direction,
   the RFID antenna devices each comprising at least two antennas,
   the at least two antennas for the goods identification system (GIS) comprising patch antennas,
   the at least two patch antennas having at least one component being arranged mutually offset in the direction of the passage region, and
   the at least two patch antennas being arranged at an equal spacing from a floor space of the passage region on the same horizontal plane or offset thereto, in such a way that a straight line laid through the center points of at least two adjacent patch antennas encloses an angle α with respect to a horizontal plane and/or a plane that is parallel to the floor space, which angle is $\leq 45°$.

2. The RFID antenna system as claimed in claim 1, wherein in the passage direction more than two patch antennas are arranged laterally offset from each other.

3. The RFID antenna system as claimed in claim 1, wherein a plurality of groups (A, B) consisting of two more patch antennas arranged laterally offset from each other are arranged at different levels to each other, different levels relative to the level of the floor space.

4. The RFID antenna system as claimed in claim 3, wherein two groups (A, B) of patch antennas arranged at different levels to each other are activated with different phase angles to generate a different up-tilt or down-tilt angle.

5. The RFID antenna system as claimed in claim 3, wherein at least two patch antennas of a group (A, B) of patch antennas, are mutually offset in the passage direction, are activated with different phase angles, whereby the monitored region can be adjusted in one direction or in the opposite direction to the passage direction.

6. The RFID antenna system as claimed in claim 1, wherein only one or a plurality of cooperating group(s) (A, B) of patch antenna are provided in an RFID antenna device.

7. The RFID antenna system as claimed in claim 6, wherein the at least one or more cooperating group(s) of patch antennas are arranged at a level with respect to the passageway and/or the floor space of the passageway which is $\geq 0.3$ m and $\leq 2$ m.

8. The RFID antenna system as claimed in claim 1, wherein a plurality of regions (X1, X2) are provided with one or more cooperating group(s) (A, B) of patch antennas which on the one hand are arranged in a low level region of the RFID antenna device or side limits and a region of the RFID antenna device or the side limits that is higher in comparison.

9. The RFID antenna system as claimed in claim 8, wherein antenna devices arranged between two regions (X1, X2) that are provided offset in the vertical and/or height direction and each comprising one or more cooperating groups (A, B) of patch antennas have a vertical spacing of at least 0.1 m and preferably less than 2.0 m, and in that the vertical spacing of the lowest patch antennas, or a lowest group of patch antennas, from the floor space of the passageway is in the range of 0.3 m to 1.5 m.

10. The RFID antenna system as claimed claim 1, wherein the patch antennas radiate in the UHF range.

11. The RFID antenna system as claimed in claim 1, wherein the patch antennas comprise a patch plane, a substrate situated therebelow and a ground plane situated therebelow, and the patch antenna thus formed is capacitively arranged upstream of a ground plane or is connected via direct current or conductively to the ground plane, the patch antenna and the ground plane being oriented transversely and preferably perpendicularly to the passageway and/or to the passage direction.

12. The RFID antenna system as claimed claim 1, wherein the patch antenna comprises a patch plane, a substrate situated therebelow and a ground plane, the patch antenna and the ground plane being oriented transversely and preferably perpendicularly to the passageway and/or to the passage direction.

13. The RFID antenna system as claimed in claim 11, wherein the substrate consists of a dielectric body.

14. The RFID antenna system as claimed in claim 11, wherein the substrate consists of air and the electrical spacers are provided for positioning and retaining the patch plane.

15. The RFID antenna system as claimed claim 1, wherein at least one group (A, B) of patch antennas comprises at least two mutually offset patch antennas, the antennas being arranged upstream of a common ground plane.

16. RFID antenna system as claimed in claim 15, wherein a group (A, B) of at least two patch antennas comprise a common substrate, on the back of which a common ground plane is provided, at least two patch planes that are electrically isolated being formed on the radiator side on the substrate so as to oppose the ground plane.

17. The RFID antenna system as claimed claim 6, wherein each patch antenna comprises a feeder which passes through a through-opening in the ground plane, an adjoining through-opening in the respective ground plane of the patch antenna and an adjoining channel which extends through the substrate as far as a feeding point on the patch plane, the feeding point being located on the lower side of the patch plane.

18. The RFID antenna system as claimed in claim 1, wherein a group (A, B) of patch antennas is arranged upstream of a common ground plane, of which the vertical extent is between 5 cm and 40 cm.

19. The RFID antenna system as claimed in claim 1, wherein additional patch antennas are provided in the lower region of the RFID antenna device and/or the side limit at the transition region to the floor space, of which the main direction of radiation and/or patch plane is pre-aligned with an upwardly pointing vertical component.

20. The RFID antenna system as claimed in claim 1, wherein one or more patch antenna are provided at the upper end region of the RFID antenna device and/or the side limit, of which the main direction of radiation and/or patch plane is assembled so as to be pre-aligned with a downwardly directed vertical component.

21. The RFID antenna system as claimed in claim 1, characterized in that at least two patch antennas that are mutually offset in the passage direction and/or at least two patch antennas that are mutually offset in the height and/or vertical direction are provided which are activated with a differently adjustable phase.

22. The RFID antenna system as claimed in claim 1, wherein, in the region of the floor space and/or above the passageway, a plurality of patch antenna(e) is/are provided so as to be mutually offset in the passage direction.

23. RFID antenna system as claimed in claim 1, wherein the patch antennas are retrofitted and/or integrated in antennas and/or frame antennas that form part of an electronic article surveillance system (EAS).

24. The RFID antenna system as claimed in claim 1, wherein a plurality of RFID antenna devices and/or side limits with lateral offset are disposed thereby forming a plurality of passageways extending therebetween, patch antennas being fitted in the middle RFID antenna devices and/or side limits, some of the antennas radiating in one direction and some in the opposing direction to monitor two passageways that are located adjacent to each other.

25. The RFID antenna system as claimed in claim 1, wherein frame antennas that form part of the article surveillance system (EAS) are provided, and in that at least one patch antenna is integrated in a frame antenna, and in that the patch antennas are integrated inside the frame antennas in a plan view of the frame antennas.

* * * * *